(12) United States Patent
Lee

(10) Patent No.: US 12,126,882 B2
(45) Date of Patent: Oct. 22, 2024

(54) CAMERA DEVICE

(71) Applicant: LG INNOTEK CO., LTD., Seoul (KR)

(72) Inventor: Chul Ho Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 103 days.

(21) Appl. No.: 17/756,670

(22) PCT Filed: Dec. 4, 2020

(86) PCT No.: PCT/KR2020/017692
§ 371 (c)(1),
(2) Date: May 31, 2022

(87) PCT Pub. No.: WO2021/112636
PCT Pub. Date: Jun. 10, 2021

(65) Prior Publication Data
US 2022/0417392 A1 Dec. 29, 2022

(30) Foreign Application Priority Data

Dec. 5, 2019 (KR) .......................... 10-2019-0160384

(51) Int. Cl.
*H04N 23/50* (2023.01)
*F16M 11/04* (2006.01)
(Continued)

(52) U.S. Cl.
CPC ................................... *H04N 23/50* (2023.01)

(58) Field of Classification Search
CPC ........ H04N 23/54; H04N 23/57; H04N 23/58; H04N 23/50; G03B 11/046; G03B 13/00;
(Continued)

(56) References Cited

U.S. PATENT DOCUMENTS

| | | | |
|---|---|---|---|
| 5,003,436 | A | 3/1991 | Yamada et al. |
| 5,951,157 | A | 9/1999 | Shirai et al. |

(Continued)

FOREIGN PATENT DOCUMENTS

| | | | |
|---|---|---|---|
| CN | 106101492 | A | 11/2016 |
| CN | 109479123 | A | 3/2019 |

(Continued)

OTHER PUBLICATIONS

International Search Report dated Mar. 19, 2021 in International Application No. PCT/KR2020/017692.
(Continued)

*Primary Examiner* — Marly S Camargo
(74) *Attorney, Agent, or Firm* — Saliwanchik, Lloyd & Eisenschenk

(57) ABSTRACT

A camera device comprises: a bracket; a camera module coupled to the bracket to be rotatable about a first axis; a viewing angle adjustment member including a side coupled to the bracket and an opposite side coupled to the camera module; and a support member coupled to the bracket, wherein the side of the viewing angle adjustment member includes a hook portion arranged between the bracket and the support member.

20 Claims, 9 Drawing Sheets

(51) Int. Cl.
*F16M 11/10* (2006.01)
*G03B 11/04* (2021.01)
*G03B 13/10* (2021.01)
*G03B 17/56* (2021.01)
*H04N 23/54* (2023.01)
*H04N 23/57* (2023.01)
*H04N 23/58* (2023.01)

(58) Field of Classification Search
CPC ...... G03B 13/10; G03B 17/561; F16M 11/14; F16M 11/2078; F16M 11/06; F16M 11/04; F16M 11/105; F16M 11/205; B60R 11/04
See application file for complete search history.

(56) References Cited

U.S. PATENT DOCUMENTS

| | | | |
|---|---|---|---|
| 10,676,039 B2 * | 6/2020 | Oh | ............ B60R 11/04 |
| 2014/0299644 A1 | 10/2014 | Aleem et al. | |
| 2014/0317987 A1 * | 10/2014 | Kuehl | ............ F16M 11/105 |
| | | | 42/90 |
| 2016/0224848 A1 | 8/2016 | Oh | |
| 2017/0023674 A1 | 1/2017 | Aleem et al. | |
| 2019/0121050 A1 * | 4/2019 | Park | ............ G02B 7/021 |
| 2021/0281727 A1 * | 9/2021 | An | ............ G02B 7/022 |
| 2023/0101960 A1 * | 3/2023 | Zhu | ............ H04N 23/50 |

FOREIGN PATENT DOCUMENTS

| | | | | |
|---|---|---|---|---|
| JP | 7-25504 U | 5/1995 | | |
| JP | 2003-197009 A | 7/2003 | | |
| JP | 2017-525310 A | 8/2017 | | |
| JP | 2018-192987 A | 12/2018 | | |
| KR | 20-0301770 Y1 | 1/2003 | | |
| KR | 2003017770 | * | 1/2003 | ........... H04N 5/2252 |
| KR | 100661051 B1 | * | 12/2006 | ............... B60R 1/00 |
| KR | 10-0815769 B1 | 3/2008 | | |
| KR | 10-2011-0107536 A | 10/2011 | | |

OTHER PUBLICATIONS

Office Action dated Mar. 16, 2023 in Chinese Application No. 202080083563.5.
Supplementary European Search Report dated Dec. 4, 2023 in European Application No. 20897026.9.
Office Action dated Aug. 6, 2024 in Japanese Application No. 2022-533624.

* cited by examiner

CAMERA DEVICE

CROSS-REFERENCE TO RELATED APPLICATIONS

This application is the U.S. national stage application of International Patent Application No. PCT/KR2020/017692, filed Dec. 4, 2020, which claims the benefit under 35 U.S.C. § 119 of Korean Application No. 10-2019-0160384, filed Dec. 5, 2019, the disclosures of each of which are incorporated herein by reference in their entirety.

TECHNICAL FIELD

The present embodiment relates to a camera device.

BACKGROUND ART

Recently, ultra-small camera modules have been developed, and ultra-small camera modules are widely used in small electronic products such as smartphones, laptops, and game consoles.

With the popularization of automobiles, ultra-small cameras are widely used not only in small electronic products but also in vehicles. For example, a black box camera for vehicle protection or objective data of traffic accidents, a rear monitoring camera that allows the driver to monitor blind spots at the rear of the vehicle through the screen to ensure safety when the vehicle moves backward, a peripheral detection camera capable of monitoring the surroundings of the vehicle, and the like are provided.

Meanwhile, as technology advances, there is a trend to apply the Lane Keeping Assist System (LKAS) that receives the video signal in front of the driving road and analyzes it in real time, and after receiving the signal and detecting a lane departure situation caused by the driver's negligence or drowsy driving, and triggering an alarm.

However, due to differences in the size of the vehicle and the angle of the windshield for each vehicle, it is necessary to use a configuration such as a separate coupler for each vehicle in order to optimize the viewing angle of the camera for the Lane Keeping Assist System, and due to this, there was a problem of the incurring of the cost of the mold.

DETAILED DESCRIPTION OF THE INVENTION

Technical Subject

The present embodiment provides a camera device capable of adjusting a viewing angle within a range of the direction angle desired by a user.

Technical Solution

As an embodiment, a camera device comprises: a bracket; a camera module coupled to the bracket to be rotatable about a first axis; a viewing angle adjustment member including one side coupled to the bracket and other side coupled to the camera module; and a support member coupled to the bracket, wherein the side of the viewing angle adjustment member includes a hook portion disposed between the bracket and the support member.

The viewing angle adjustment member may include a body and a screw thread formed on the other side of the body, and the hook portion may be extended from the body to an outer periphery.

The support member may include a main body coupled to the bracket, and a protruded portion being extended from the main body and being in contact with a hook portion of the viewing angle adjustment member.

The protruded portion includes a plurality of protruded units, and the body may be disposed in a space between the plurality of protruded units.

The support member may include a first opening being formed between the plurality of protruded units.

The protruded portion presses one surface of the hook portion so that the other surface of the hook portion may be in contact with the bracket.

The main body of the support member may be screw-coupled to the bracket.

The support member includes a first guide portion formed on the main body, and the bracket may include a second guide portion corresponding to the first guide portion.

The bracket may include a second opening in which the body of the viewing angle adjustment member is being disposed.

As another embodiment, a camera device includes: a bracket; a camera module coupled to the bracket to enable viewing angle control; a viewing angle adjustment member for adjusting a viewing angle of the camera module; and a support member limiting an unintentional movement of the viewing angle adjustment member.

Advantageous Effects

According to the present embodiment, it is possible to provide a camera device capable of adjusting a viewing angle to a direction angle within a desired range.

Through the present embodiment, it is possible to provide a camera device capable of minimizing a change in viewing angle due to a manufacturing tolerance of a camera module or a tolerance occurring when mounting on a vehicle.

Through the present embodiment, it is possible to provide a camera device capable of minimizing a change in viewing angle caused by an external force or vibration, and the like during mounting process on a vehicle or after mounting.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Hereinafter, the present invention will be described in more detail with reference to the accompanying drawings.

Figure 1:
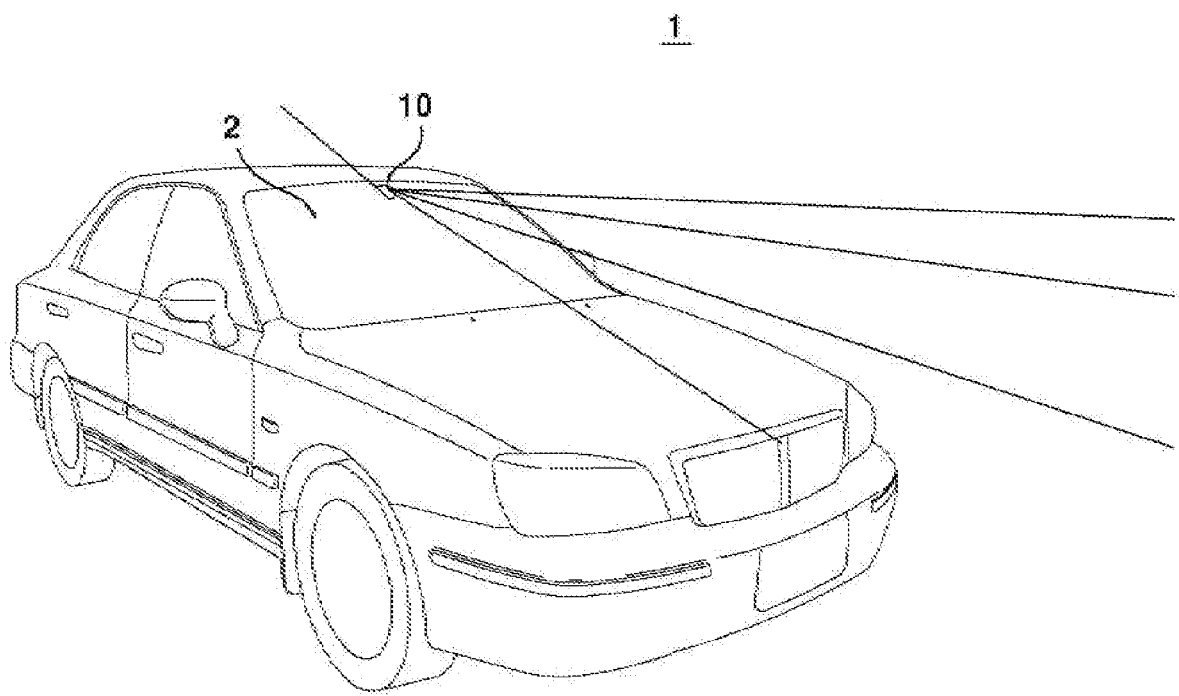
FIG. 1 is a schematic diagram of a vehicle in which a camera device according to an embodiment of the present invention is installed.

FIG. 1 is a schematic diagram of a vehicle in which a camera device according to an embodiment of the present invention is installed.

Referring to FIG. 1, a camera device 10 according to an embodiment of the present invention may be coupled to a wind glass 2 of a vehicle 1. A wind glass 2 may be disposed at the front or rear of the vehicle 1. The wind glass 2 is formed of a transparent material so that the driver can look forward or backward. The wind glass 2 may include a front wind glass disposed at the front of the vehicle 1 and a rear wind glass disposed at the rear of the vehicle. The camera device 10 may be coupled to an inner surface of the wind glass 2. In an embodiment of the present invention, the camera device 10 is described as being coupled to the front wind glass as an example, but may be coupled to the rear wind glass. Although the bracket 100 of the camera device 10 may be directly coupled to the inner side surface of the wind glass 2 by a method such as adhesion, but it is not excluded that the camera device 10 is coupled to the wind glass 2 through a separate coupler (not shown) and/or a cover (not shown).

Figure 2:
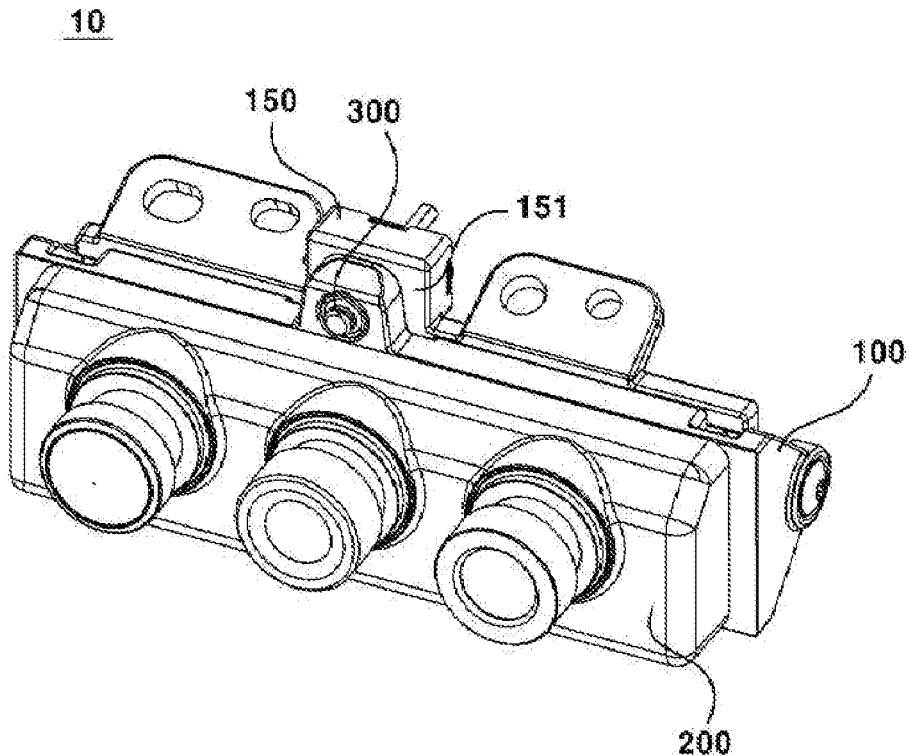
FIGS. 2 and 3 are perspective views of a camera device according to an embodiment of the present invention.
Figure 3:
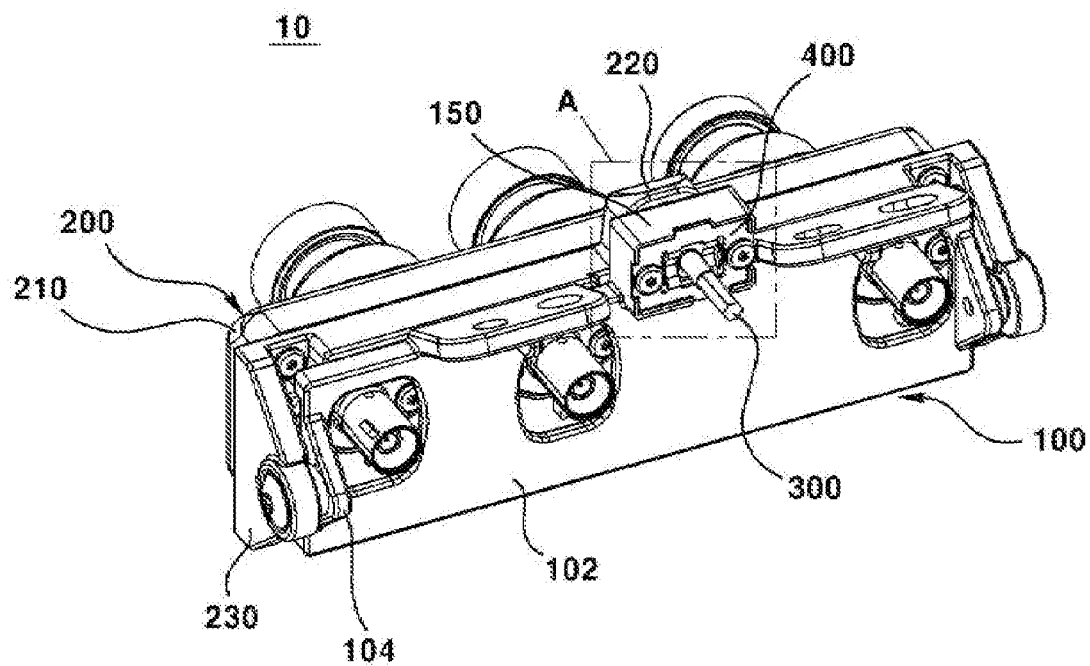
Figure 4:
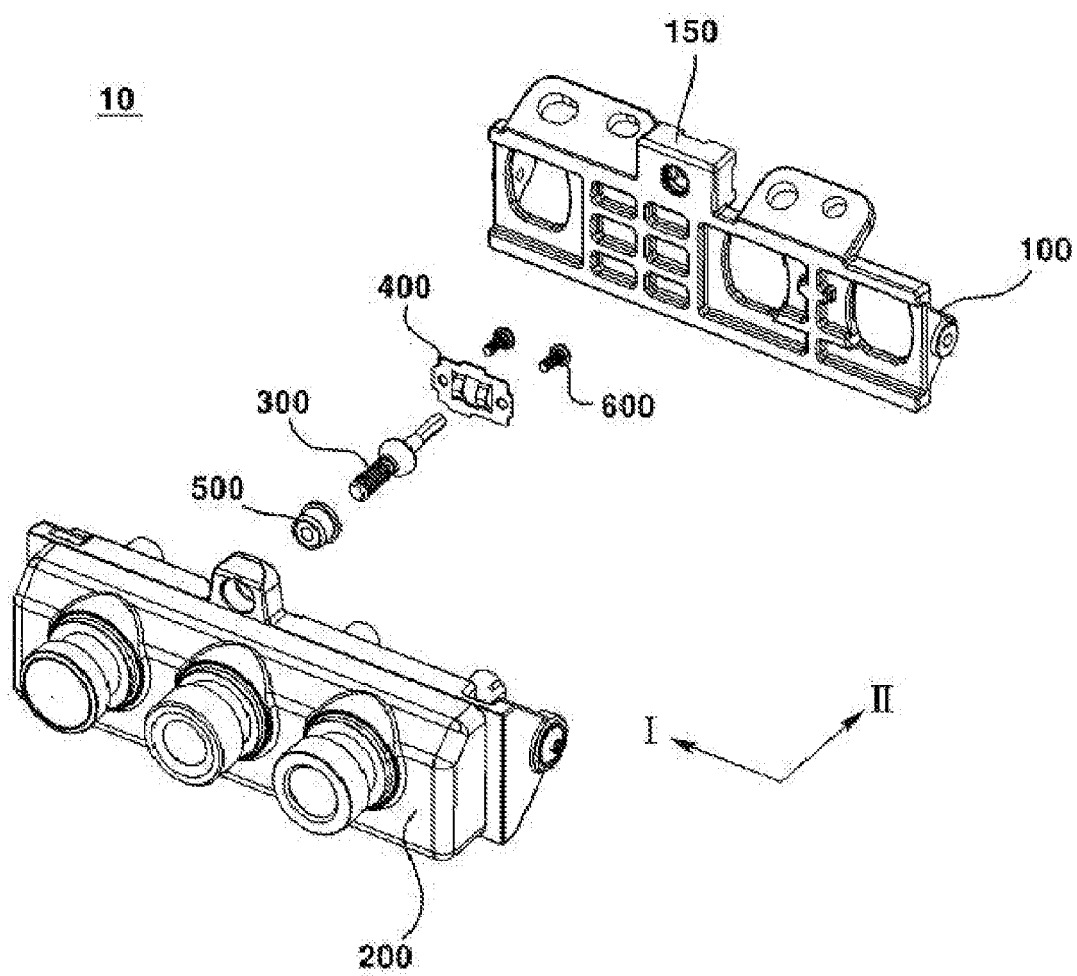
FIG. 4 is an exploded perspective view of a camera device according to an embodiment of the present invention.
Figure 5:
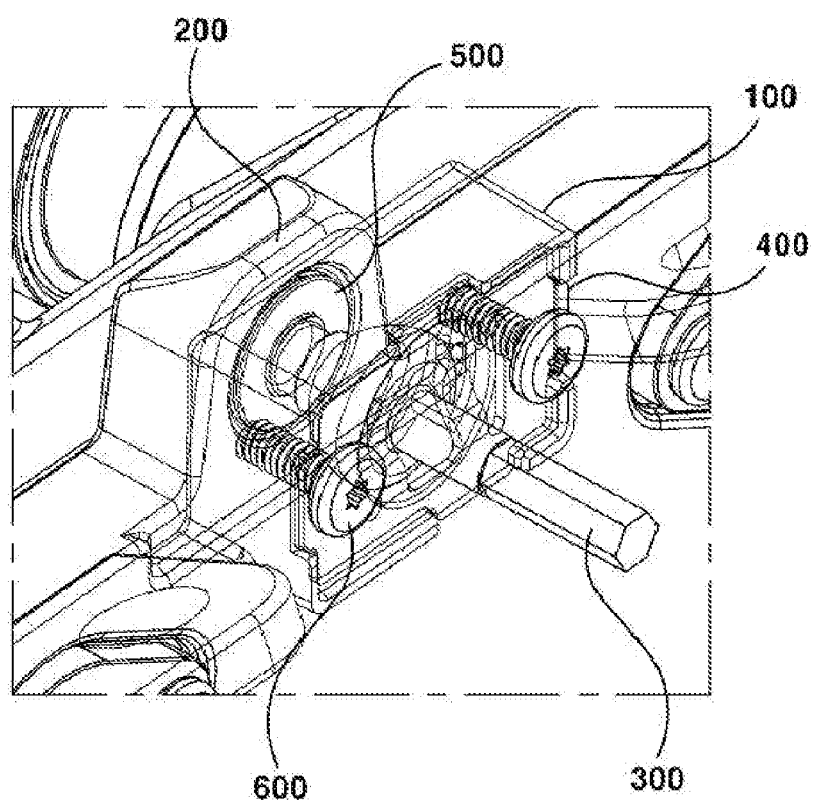
FIG. 5 is an enlarged view of part A of FIG. 3.
Figure 6:
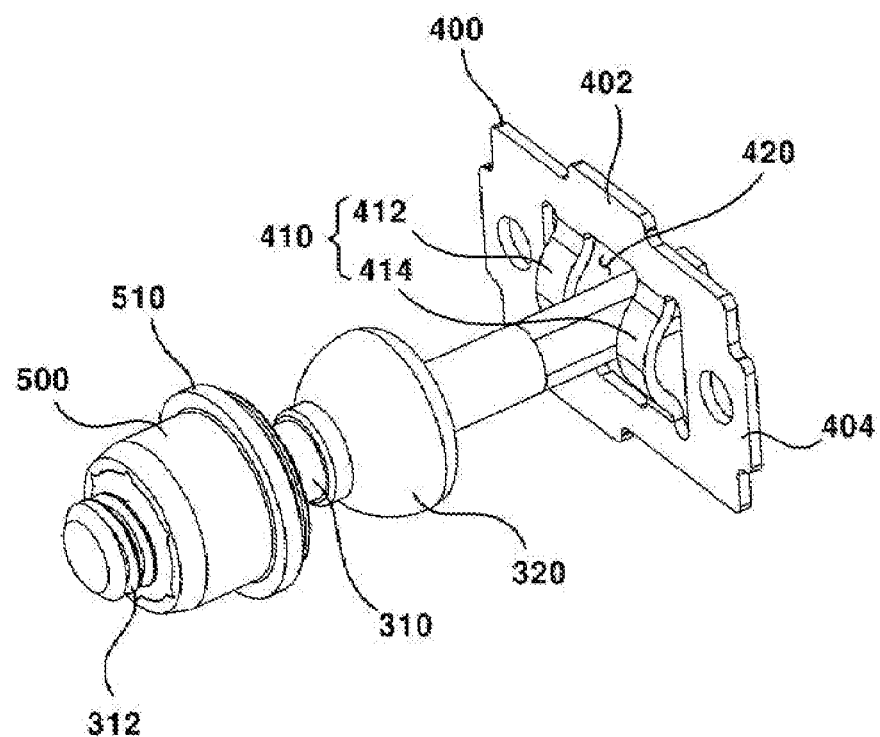
FIGS. 6 to 8 are perspective views of partial configurations of camera devices according to an embodiment of the present invention.
Figure 7:
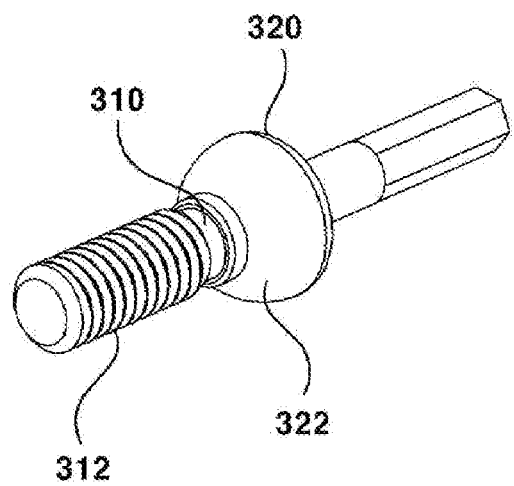
Figure 8:
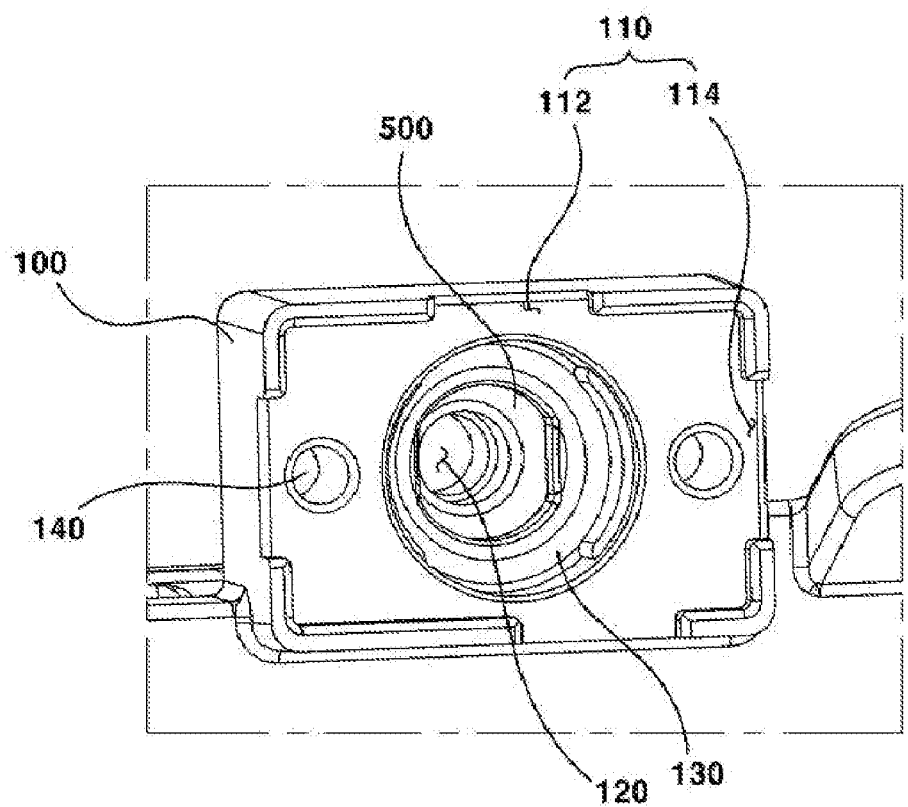
Figure 9:
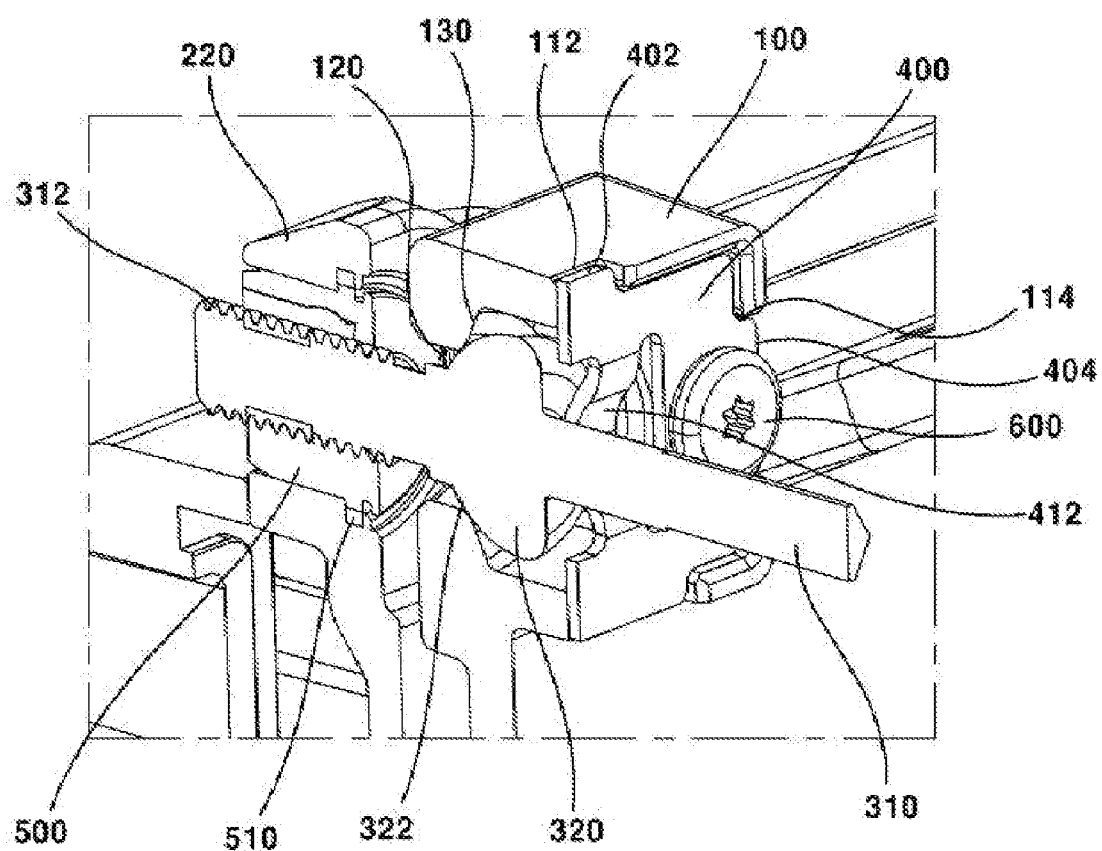
FIG. 9 is a schematic diagram of a partial configuration of a camera device according to an embodiment of the present invention.

FIGS. 2 and 3 are perspective views of a camera device according to an embodiment of the present invention. FIG. 4 is an exploded perspective view of a camera device according to an embodiment of the present invention. FIG. 5 is an enlarged view of part A of FIG. 3. FIGS. 6 to 8 are perspective views of partial configurations of camera devices according to an embodiment of the present invention. FIG. 9 is a schematic diagram of a partial configuration of a camera device according to an embodiment of the present invention.

Referring to FIGS. 2 to 9, the camera device 10 according to an embodiment of the present invention may include: a bracket 100; a camera module 200; a viewing angle adjustment member 300; and a support member 400; and an anti-loosening unit 500, but may be implemented except for some of these components, and does not exclude additional components.

The camera device 10 may be installed on the wind glass 2 of the vehicle 1. The camera device 10 may adjust the photographing direction of the camera module 200. Through this, the viewing angle can be adjusted within the range of the direction angle desired by a user by compensating for the manufacturing tolerance of the camera module 200 or the mounting tolerance on the vehicle 1.

The camera device 10 may include a bracket 100. The bracket 100 may be disposed on one side of the camera module 200. The bracket 100 may be disposed at a rear side of the camera module 200. The bracket 100 may be mounted on the wind glass 2 of the vehicle 1. The bracket 100 may rotatably support the camera module 200. At least a portion of the viewing angle adjustment member 300 and the support member 400 may be disposed on the bracket 100.

The bracket 100 may include a body part 102. The body part 102 of the bracket 100 may support the housing 210 of the camera module 200. The body part 102 of the bracket 100 may be disposed on one side or the rear side of the housing 210 of the camera module 200. The body part 102 of the bracket 100 may be formed in a shape and size corresponding to the housing 210 of the camera module 200. An extension portion 104 may be formed on one or both ends of the body part 102 of the bracket 100, and a support portion 150 may be formed on the upper portion.

The bracket 100 may include an extension portion 104. The extension portion 104 may be integrally formed with the bracket 100. The extension portion 104 of the bracket 100 may be formed to be extended from one or both ends of the body part 102. The extension portion 104 of the bracket 100 may be coupled to the extension portion 230 of the camera module 200. The extension portion 104 of the bracket 100 may be hinged with the extension portion 230 of the camera module 200. The extension portion 104 of the bracket 100 may rotatably support the extension portion 230 of the camera module 200. In one embodiment of the present invention, the extension portion 104 is described as being extended from both ends of the body part 102 of the bracket 100 to one side or to the rear side as an example, but is not limited thereto and the body part of the bracket 100 is not limited thereto. It may be formed to be extended forward from both ends of 102 or to be extended in the peripheral direction.

The bracket 100 may include a support portion 150. The support portion 150 may be integrally formed with the bracket 100. That is, the support portion 150 and the extension portion 104 may be formed as one body. The support portion 150 of the bracket 100 may be disposed on an upper portion of the body part 102. The support portion 150 may be formed to be extended upward from an upper of the body part 102. A support member 400 may be disposed on the support portion 150. One side of the viewing angle adjustment member 300 may be disposed on the support portion 150. The support portion 150 may face a coupling portion 220 of the camera module 200. The support portion 150 may be spaced apart from the coupling portion 220 of the camera module 200 by a predetermined distance.

The support portion 150 may include a first surface 151. The first surface 151 of the support portion 150 may be disposed between the camera module 200 and one side of the viewing angle adjustment member 300. The first surface 151 of the support portion 150 may be disposed to face the coupling portion 220 of the camera module 200. The first surface 151 of the support portion 150 may face a second surface.

The support portion 150 may include a second surface. The second surface of the support portion 150 may face a first surface 151. The second surface of the support portion 150 may not face the coupling portion 220 of the camera module 200. A support member 400 may be disposed on a second surface of the support portion 150. A support member 400 may be screw-coupled to a second surface of the support portion 150 by a coupling member 600. A coupling member 600 may be screw-coupled into the recess 140 formed on a second surface of the support portion 150.

The bracket 100 may include a second guide portion 110. The second guide portion 110 may be formed in the support portion 150 of the bracket 100. The second guide portion 110 may be formed on a second surface of the support portion 150 of the bracket. The second guide portion 110 may be integrally formed with the support portion 150. The second guide part 110 may correspond to the first guide portions 402 and 404 formed on a main body of the support member 400.

The second guide portion 110 may include a plurality of second guide portions 112 and 114. The plurality of second guide portions 112 and 114 may be formed in a groove shape. Some of the plurality of second guide portions 112 and 114 may be vertically spaced apart from each other. Some of the plurality of second guide portions 112 and 114 may have regions not being overlapped with each other in a vertical direction. Other portions 114 of the plurality of second guide portions 112 and 114 may be spaced apart from each other in a horizontal direction. Other portions 114 of the plurality of second guide portions 112 and 114 may be overlapped in the horizontal direction.

The bracket 100 may include a second opening 120. The second opening 120 may be formed in the support portion 150. The second opening 120 may penetrate through a first surface and a second surface of the support portion 150. The body 310 of the viewing angle adjustment member 300 may be disposed in the second opening 120. A region between the screw thread 312 and the hook portion 320 of the body 310 of the viewing angle adjustment member 300 may be disposed in the second opening 120. At least a portion of the other surface of the hook portion 320 may be disposed in the second opening 120.

The bracket 100 may include an inclined surface 130. The inclined surface 130 may be disposed on an inner surface of the support portion 150. The inclined surface 130 may be formed in a shape in which the cross-sectional area of the inner surface of the support portion 150 becomes smaller as it travels toward the rear side. The inclined surface 130 may be disposed on the support portion 150 of the bracket 100. The inclined surface 130 may be disposed on a second surface of the support portion 150 of the bracket 100. The inclined surface 130 may be disposed in the second opening 120 of the bracket 100. The inclined surface 130 may be disposed adjacent to the second opening 120 of the bracket 100. The inclined surface 130 may be formed in a curved surface shape. A cross-section of the inclined surface 130 may be formed in a curved line shape. The inclined surface 130 may be in contact with the viewing angle adjustment member 300. The inclined surface 130 may be in contact with the hook portion 320 of the viewing angle adjustment member 300. A radius of curvature of the inclined surface 130 may correspond to a radius of curvature of the other surface 322 of the hook portion 320 of the viewing angle adjustment member 300.

The camera device 10 may include a camera module 200. The camera module 200 may be disposed in the bracket 100. The camera module 200 may be disposed on the other side or front of the bracket 100. The camera module 200 may be rotatably coupled to the bracket 100. The camera module 200 may be arranged around the first axis I. In an embodiment of the present invention, the camera module 200 is described by taking a triple camera as an example, but is not limited thereto and may be variously changed, such as a dual camera.

The housing 210 of the camera module 200 may form the outer appearance of the camera module. The housing 210 may include at least one hole in which at least one lens module is mounted. In the housing 210, components capable of comprising at least one camera may be disposed. The housing 210 may be disposed in front of the body part 102 of the bracket 100. A coupling portion 220 may be formed on an upper portion of the housing 210.

The other side of the viewing angle adjustment member 300 may be coupled to the coupling portion 220 of the camera module 200 so that the position of the camera module 200 may be adjusted. The coupling portion 220 may face the support portion 150 of the bracket 100. The coupling portion 220 may be spaced apart from the support portion 150 of the bracket 100 by a predetermined interval. When the distance between the coupling portion 220 and the support portion 150 of the bracket 100 is increasing, the gap between the upper portion of the camera module 200 and the upper portion of the bracket 100 may be increasing. When the gap between the coupling portion 220 and the support portion 150 of the bracket 100 is increasing, the gap between the lower portion of the camera module 200 and the lower portion of the bracket 100 may be decreasing. When the gap between the coupling portion 220 and the support portion 150 of the bracket 100 is increasing, the gap between the upper portion of the camera module 200 and the upper portion of the bracket 100 may become larger than the gap between the lower portion of the camera module 200 and the lower portion of the bracket 100. The other side of the viewing angle adjustment member 300 may be screw-coupled to the coupling portion 220. The screw thread 312 of the body 310 of the viewing angle adjustment member 300 may be screw-coupled to the coupling portion 220. The distance between the coupling portion 220 and the support portion 150 may be adjusted through the length of the body 310 screw-coupled to the coupling portion 220. That is, the rotation angle of the camera module 200 with respect to the bracket 100 can be adjusted through the length at which the coupling portion 220 of the camera module 200 and the viewing angle adjustment member 300 are being screw-coupled together.

The coupling portion 220 of the camera module 200 may include a second groove 225. An anti-loosening unit 500 may be disposed in the second groove 225 of the coupling portion 220. The inside of the second groove 225 of the coupling portion 220 of the camera module 200 may be penetrated by the body 310 of the viewing angle adjustment member 300. The second groove 225 has been described by taking the groove as an example, but it is not excluded that it is a hole.

The extension portion 230 of the camera module 200 may be formed in the housing 210. The extension portion 230 may formed by being extended from one side end or both ends of the housing 210. The extension portion 230 of the camera module 200 may be hinge-coupled to the extension portion 104 of the bracket 100. Through this, the camera module 200 may rotate with respect to the bracket 100. In one embodiment of the present invention, the extension portion 230 of the camera module 200 is described to be formed by being extended to one side or rear side from both ends of the housing 210 as an example, but is not limited thereto and it may be formed by being extended forward from both ends of the housing 210 or may be formed by being extended in an outer peripheral direction.

The camera device 10 may include a viewing angle adjustment member 300. One side of the viewing angle adjustment member 300 may be disposed on the bracket 100. The other side of the viewing angle adjustment member 300 may be coupled to the camera module 200 so that the position of the camera module 200 can be adjusted. The other side of the viewing angle adjustment member 300 may be screw-coupled to the camera module 200. A length at which the viewing angle adjustment member 300 and the camera module 200 are screw-coupled together and a rotation angle of the camera module 200 with respect to the bracket 100 may correspond to each other.

A direction connecting one side and the other side of the viewing angle adjustment member 300 may be a different direction from the first axis I. A direction connecting one side and the other side of the viewing angle adjustment member 300 may be a second axis II direction. The second axis II direction may be perpendicular to the first axis I direction. The viewing angle adjustment member 300 may rotate about the second axis II.

The viewing angle adjustment member 300 may include a body 310. The body 310 of the viewing angle adjustment member 300 may be formed in a cylindrical shape. A screw thread 312 may be formed on the outer peripheral surface of the body 310. A screw thread 312 may be formed on the outer peripheral surface of the other side of the body 310. A hook portion 320 may be disposed between the region where the thread 312 is formed and one end portion of the body 310.

A region in which the screw thread 312 is being formed among the body 310 of the viewing angle adjustment member 300 may be screw-coupled to the coupling portion 220 of the camera module 200. Among the body 310 of the viewing angle adjustment member 300, the area where the screw thread 312 is not formed may be disposed on the bracket 100. A region of the body 310 of the viewing angle adjustment member 300 among the screw thread 312 is not formed may be disposed on the support portion 150 of the bracket 100.

A support member 400 may be disposed in a region disposed between one end portion 311 and the hook portion 320 of the body 310 of the viewing angle adjustment member 300. The region disposed between one end portion of the body 310 among the viewing angle adjustment member 300 and the hook portion 320 may be disposed in the second opening 120 of the support portion 150 of the bracket 100.

The viewing angle adjustment member 300 may include a hook portion 320. The hook portion 320 may be formed by being extended in the outer peripheral direction from the body 310. The hook portion 320 may be disposed between the portion of the body 310 in which the screw thread is formed and one end portion thereof. The hook portion 320 may be spaced apart from one end portion by a predetermined distance. The hook portion 320 may be spaced apart from the screw thread 312. The hook portion 320 may be formed in a disk shape. The other surface 322 of the hook portion 320 in contact with the bracket 100 may be formed in a curved surface shape.

The hook portion 320 may be disposed between a first surface and a second surface of the support portion 150 of the bracket 100. The hook portion 320 may be disposed in a second opening 120 of the bracket 100. The other surface 322 of the hook portion 320 being formed in a curved surface shape may be in contact with the inclined surface 130 of the bracket 100. The other surface 322 of the hook portion 320 being formed may be in contact with the inclined surface 130 being formed in the second opening 120 of the bracket 100. The radius of curvature of the other surface 322 of the hook portion 320 may correspond to the radius of curvature of the inclined surface 130 of the bracket 100. One surface of the hook portion 320 may be supported by the support member 400. One surface 321 of the hook portion 320 may be in contact with the protruded portion 410 of the support member 400. Accordingly, it is possible to inhibit the viewing angle adjustment member 300 from moving against the user's intention as an external force or vibration is being delivered. Specifically, one surface of the hook portion 320 is supported by the protruded portion 410 of the support member 400, and a state in which the other surface 322 of the hook portion 320 is being in contact with the inclined surface 130 of the bracket 100 can be maintained. Accordingly, even if an external force or vibration is delivered to the viewing angle adjustment member 300 in a direction in which the bracket 100 and the camera module 200 are loosened, the hook portion 320 of the viewing angle adjustment device 300 is attached to the bracket 100, since it is possible to apply a pushing force in the direction of the support portion 150, it is possible to inhibit the coupling between the bracket 100 and the camera module from loosening.

In an embodiment of the present invention, the other side of the viewing angle adjustment member 300 means a direction in which the camera module 200 is positioned, and one side may be interpreted to mean a direction opposite to the other side.

The camera device 10 may include a support member 400. The support member 400 may be disposed on the bracket 100. The support member 400 may be disposed on the support portion 150 of the bracket 100. The support member 400 may be coupled to the bracket 100. The support member 400 may be coupled to the bracket 100 by a coupling member 600. The support member 400 may be screw-coupled to the bracket 100 by the coupling member 600. The support member 400 may bring the viewing angle adjustment member 300 into contact with the bracket 100. Specifically, the support member 400 supports one side of the viewing angle adjustment member 300 to attach the other surface 322 of the hook portion 320 of the viewing angle adjustment member 300 to the inclined surface 130 of the bracket 100 so as to be in contact therewith continuously. The support member 400 may be formed of a material having elasticity. The support member 400 may be formed of a metal material.

The support member 400 may include a main body. The main body of the support member 400 may be formed in a square plate shape. The main body of the support member 400 may be coupled to the bracket 100. The main body of the support member 400 may be coupled to the support portion 150 of the bracket 100. The main body of the support member 400 may be screw-coupled to the support portion 150 of the bracket 100. The main body of the support member 400 may be screw-coupled to the support portion 150 of the bracket 100 by the coupling member 600.

The support member 400 may include a protruded portion 410. The protruded portion 410 may be disposed on the main body of the support member 400. The protruded portion 410 is extended from the main body of the support member 400 to be formed and protruded in a direction toward the viewing angle adjustment member 300. A cross-section of the protruded portion 410 may have a curved surface shape. At least a portion of the protruded portion 410 may be bent. A central region of the protruded portion 410 may be in contact with the viewing angle adjustment member 300. The protruded portion 410 may be in contact with the hook portion 320 of the viewing angle adjustment member 300. The protruded portion 410 presses one surface of the hook portion 320 of the viewing angle adjustment member 300 so that the other surface of the hook portion 320 is in contact with the bracket 100.

The protruded portion 410 may include a plurality of protruded units 412 and 414. The plurality of protruded units 412 and 414 may be spaced apart from each other. A viewing angle adjustment member 300 may be disposed in the space 420 between the plurality of protruded units 412 and 414. The body 310 of the viewing angle adjustment member 300 may be disposed in the space 420 between the plurality of protruded units 412 and 414. The space 420 between the plurality of protruded units 412 and 414 may be penetrated by one side of the body 310 of the viewing angle adjustment member 300.

The support member 400 may include a first opening 420. The first opening 420 may be formed in the main body of the support member 400. The first opening 420 may be formed in a central region of the main body of the support member 400. The first opening 420 may be formed between the plurality of protruded units 412 and 414. The first opening 420 may mean a space between the plurality of protruded units 412 and 414. The first opening 420 may be penetrated by the body 310 of the viewing angle adjustment member 300. A cross-section of the first opening 420 may be formed in a rectangular shape.

The support member 400 may include first guide portions 402 and 404. The first guide portions 402 and 404 may be formed on the main body of the support member 400. The first guide portions 402 and 404 may correspond to the second guide portion 110 of the bracket 100. The first guide portions 402 and 404 may protrude outward from the main body of the support member 400. The first guide portions 402 and 404 may be guide protrusions being protruded outward from the main body. Since the first guide portions 402 and 404 are disposed on the second guide portion 110, the coupling position of the support member 400 with respect to the bracket 100 may be guided.

The first guide portions 402 and 404 may include a plurality of first guide portions 402 and 404. The plurality of first guide portions 402 and 404 may be formed in a protrusion shape. The plurality of first guide portions 402 and 404 may be disposed on the plurality of second guide portions 112 and 114, respectively. Some of the plurality of first guide portions 402 and 404 may be vertically spaced apart from each other. A portion 402 of the plurality of first guide portions 402 and 404 may have a region that does not overlap each other in a vertical direction. The other portion 404 of the plurality of first guide portions 402 and 404 may be spaced apart from each other in the horizontal direction. The other portion 404 of the plurality of first guide portions 402 and 404 may be overlapped in the horizontal direction.

The camera device 10 may include an anti-loosening unit 500. The anti-loosening unit 500 may be disposed in the camera module 200. The anti-loosening unit 500 may be disposed in the coupling portion 220 of the camera module 200. The anti-loosening unit 500 may be disposed in the second groove 225 of the coupling portion 220 of the camera module 200. The anti-loosening unit 600 may be disposed by being press-fitted between the camera module 200 and the viewing angle adjustment member 300. The anti-loosening unit 500 may be disposed between the second groove 225 of the coupling portion 220 of the camera module 200 and the viewing angle adjustment member 300. The anti-loosening unit 500 may be penetrated by the viewing angle adjustment member 300. The anti-loosening unit 500 may be penetrated by the body 310 of the viewing angle adjustment member 300. In an embodiment of the present invention, the anti-loosening unit 500 may refer to a locknut. The anti-loosening unit 500 may perform a function of inhibiting loosening of the viewing angle adjustment member 300 being screw-coupled to the coupling portion 220.

The anti-loosening unit 500 may include a flange portion 510. The flange portion 510 may be extended outward from the anti-loosening unit 500. The flange portion 510 may be formed on one side of the anti-loosening unit. The flange portion 510 may have a saw-tooth shape. When the anti-loosening unit 500 is fitted into the second groove 225 of the coupling portion 220, the flange portion 510 may be press-fitted into the region adjacent to the second groove 225 of the coupling portion 220. Through this, it is possible to inhibit the anti-loosening unit 500 from being separated from the coupling portion 220.

Figure 10:
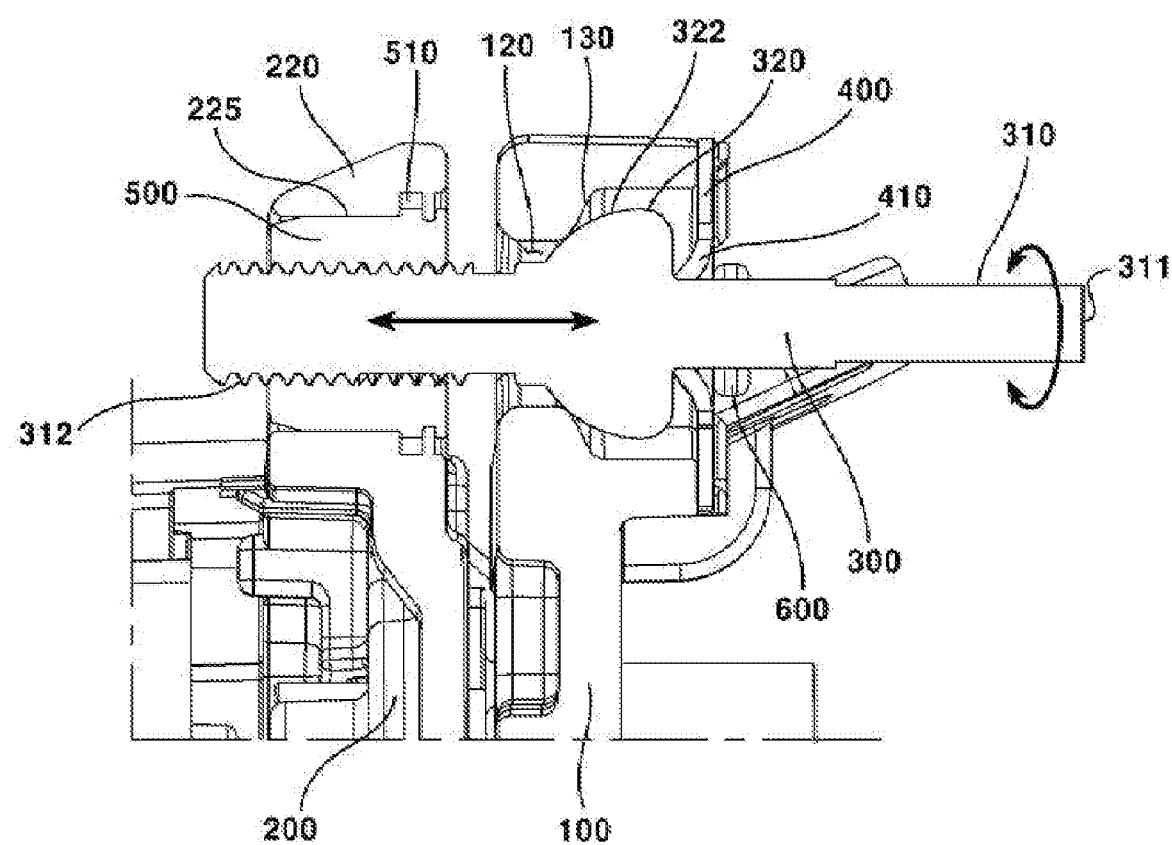
FIGS. 10 and 11 are operational diagrams of a camera device according to an embodiment of the present invention.
Figure 11:
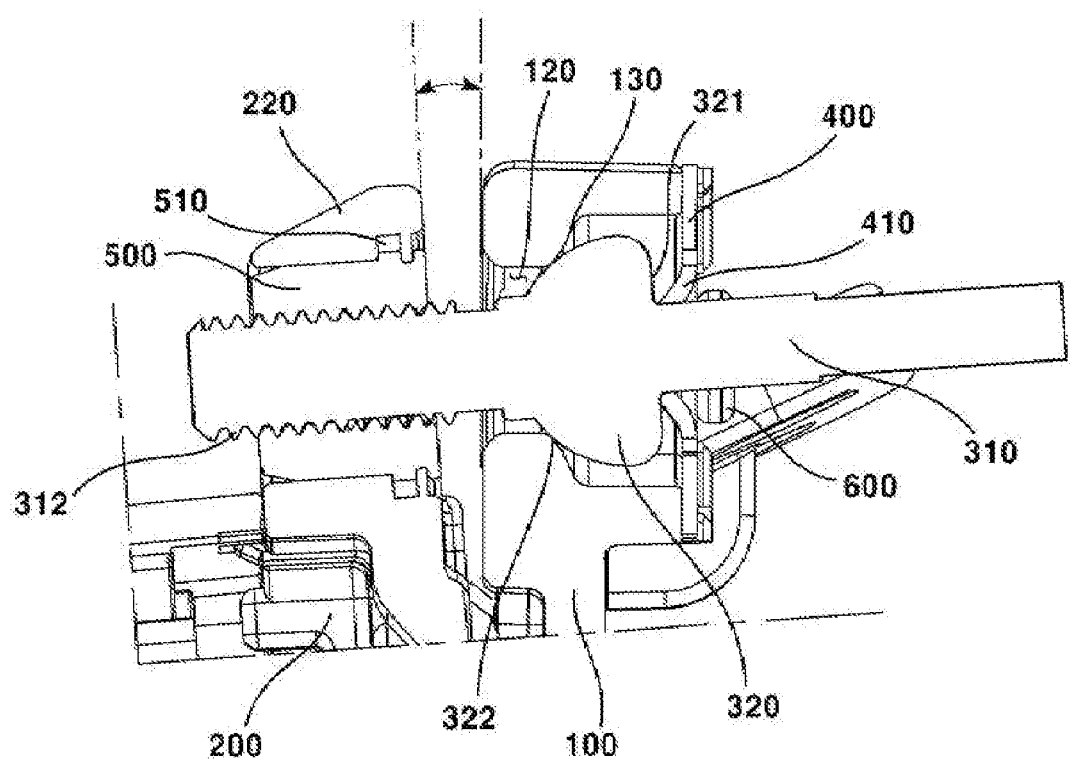

FIGS. 10 and 11 are operational diagrams of a camera device according to an embodiment of the present invention.

Referring to FIGS. 10 and 11, when a user turns one end portion of the viewing angle adjustment member 300 using a tool, the viewing angle adjustment member 300 being screw-coupled to the coupling portion 220 of the camera module 200 rotates in one direction and adjusts the length of screw-coupling. Through this, it is possible to adjust the rotation angle of the camera module 200 with respect to the bracket 100 by adjusting the separation distance between the upper portion of the camera module 200 and the upper portion of the bracket 100. Through this, the camera device 10 according to an embodiment of the present invention may provide an optimal viewing angle of the camera module 200.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:
1. A camera device comprising:
a bracket;
a camera module coupled to the bracket to be rotatable about a first axis;
a viewing angle adjustment member including one side coupled to the bracket and an other side coupled to the camera module; and
a support member coupled to the bracket;

wherein the viewing angle adjustment member includes a body, a hook portion formed on one side of the body and disposed between the bracket and the support member, and a screw thread formed on another side of the body,
wherein the hook portion extends from the body to an outer periphery, and
wherein the camera module and the support member are located at opposite sides of the bracket.

2. The camera device according to claim 1,
wherein the support member includes a main body coupled to the bracket, and a protruded portion being extended from the main body and being in contact with a hook portion of the viewing angle adjustment member.

3. The camera device according to claim 2,
wherein the protruded portion includes a plurality of protruded units, and the body is disposed in a space between the plurality of protruded units.

4. The camera device according to claim 3,
wherein the support member includes a first opening formed between the plurality of protruded units.

5. The camera device according to claim 2,
wherein the protruded portion presses one surface of the hook portion so that an other surface of the hook portion is in contact with the bracket.

6. The camera device according to claim 5,
wherein the main body of the support member is screw-coupled to the bracket.

7. The camera device according to claim 2,
wherein the support member includes a first guide portion formed on the main body, and
wherein the bracket includes a second guide portion corresponding to the first guide portion.

8. The camera device according to claim 1,
wherein the bracket includes a second opening in which the body of the viewing angle adjustment member is disposed.

9. The camera device according to claim 1, wherein a surface of the hook portion of the viewing angle adjustment member in contact with the bracket is formed in a curved shape, and
wherein the bracket includes an inclined surface having a curved shape corresponding to the curved shape of the surface of the hook portion.

10. The camera device according to claim 9, wherein the inclined surface is disposed adjacent to the second opening, and
wherein at least a portion of the surface of the hook portion is disposed in the second opening.

11. A camera device comprising:
a bracket;
a camera module coupled to the bracket to enable viewing angle control;
a viewing angle adjustment member configured to adjust a viewing angle of the camera module; and
a support member configured to limit an unintentional movement of the viewing angle adjustment member,
wherein the viewing angle adjustment member includes a hook portion,
wherein the support member includes a protrusion configured to press the hook portion to contact the bracket, and
wherein the camera module and the support member are located at opposite sides of the bracket.

12. The camera device according to claim 11, wherein the viewing angle adjustment member is disposed to be rotatable in a first axis, and
wherein the camera module is disposed to be rotatable in a second axis perpendicular to the first axis with respect to the bracket.

13. The camera device according to claim 11, wherein an anti-loosening unit is press-fitted between the camera module and the viewing angle adjustment member.

14. A camera device comprising:
a bracket;
a camera module coupled to the bracket to be rotatable about a first axis;
a viewing angle adjustment member including one side coupled to the bracket and an other side coupled to the camera module; and
a support member coupled to the bracket;
wherein the viewing angle adjustment member includes a body, a hook portion formed on one side of the body and disposed between the bracket and the support member, and a screw thread formed on another side of the body,
wherein the hook portion extends from the body to an outer periphery,
wherein the camera module includes a coupling part to which the other side of the viewing angle adjustment member is coupled so that a position of the camera module is adjustable,
wherein the coupling part and the bracket are spaced apart from each other by a predetermined interval, and
wherein when a distance between the coupling part and the bracket increases, a gap between an upper part of the camera module and an upper part of the bracket becomes greater than a gap between a lower part of the camera module and a lower part of the bracket.

15. The camera device according to claim 14, wherein the coupling part includes a second groove.

16. The camera device according to claim 15, wherein an anti-loosening unit is disposed in the second groove, and the viewing angle adjustment member passes therethrough.

17. The camera device according to claim 16, wherein the anti-loosening unit includes a flange part extending outward,
wherein the flange part has a sawtooth shape, and
wherein when the anti-loosening unit is fitted into the second groove, the flange part is press-fitted into an area adjacent to the second groove of the coupling part.

18. The camera device according to claim 14, wherein the one side and the other side of the viewing angle adjustment member are disposed in a second axis, and
wherein the second axis is perpendicular to the first axis.

19. The camera device according to claim 18, wherein the viewing angle adjustment member rotates about the second axis.

20. A camera device comprising:
a bracket;
a camera module coupled to the bracket to be rotatable about a first axis;
a viewing angle adjustment member including one side coupled to the bracket and an other side coupled to the camera module; and
a support member coupled to the bracket;
wherein the viewing angle adjustment member includes a body, a hook portion formed on one side of the body and disposed between the bracket and the support member, and a screw thread formed on another side of the body, wherein the hook portion extends from the body to an outer periphery, and wherein the camera module includes a housing and extension portions extending from both ends of the housing, and wherein the extension portions are hinged to the bracket.

\* \* \* \* \*